Figure 1:
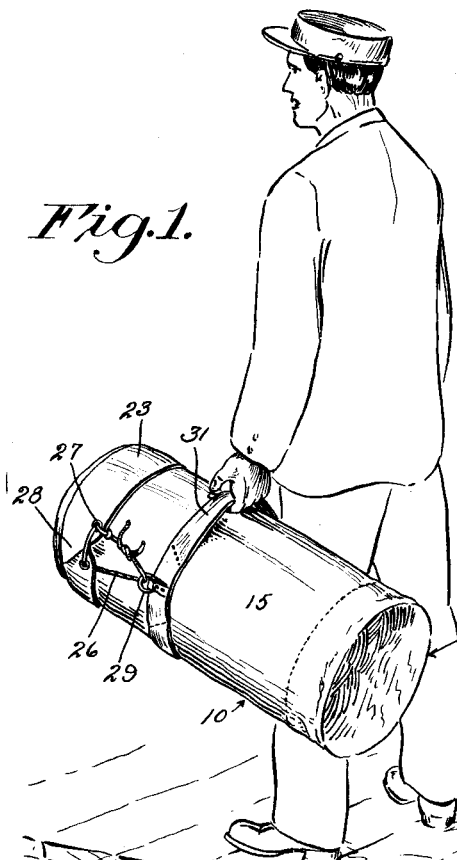

Oct. 15, 1929.  G. F. LESSENHOP  1,732,098
ICE CREAM CAN SHIPPING CASE
Filed April 23, 1926  2 Sheets-Sheet 1

George F. Lessenhop
INVENTOR

BY John Milton Jester
ATTORNEY

Oct. 15, 1929.  G. F. LESSENHOP  1,732,098
ICE CREAM CAN SHIPPING CASE
Filed April 23, 1926   2 Sheets-Sheet 2
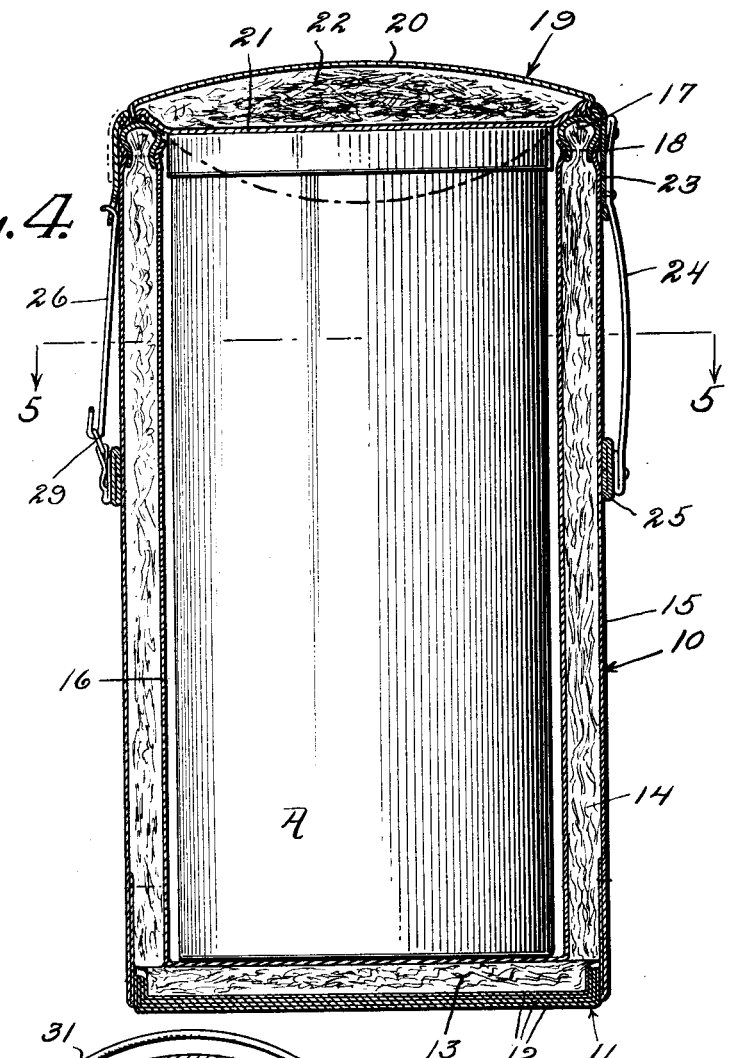
George F. Lessenhop
INVENTOR
BY John Milton Jester
ATTORNEY Patented Oct. 15, 1929

1,732,098

UNITED STATES PATENT OFFICE

GEORGE F. LESSENHOP, OF LINCOLN, NEBRASKA

ICE CREAM CAN SHIPPING CASE

Application filed April 23, 1926. Serial No. 104,041.

This invention relates to shipping containers and has for its object the provision of a novel container within which an ice cream can or the like may be shipped, the construction and arrangement being such that adequate heat insulating means is provided for reducing likelihood of melting of the ice cream during storage or shipment.

It is well known that it is customary, when shipping ice cream, to place the cans within containers designed to protect the ice cream against temperature changes so as to obviate the probability of deterioration on account of melting. Containers have been designed but practically all are open to the objection that the handle structure is such that when an attendant at a loading platform or other place wishes to transport the ice cream can, he can grasp a carrying strap and pull the can and its protective container along the platform, this action, quite naturally, resulting in an excessive degree of wear upon the protective casing so that it is bound to have a short life. It is also known that the broad idea of providing a heat insulating casing has been developed to a practical extent. Various devices have been designed for the purpose of insulating cans of ice cream against temperature changes during transportation but it has been a great objection that the known structures embody carrying straps or handles so arranged that the devices may be dragged along a loading platform or the like whereas the arrangement should be such that this will be inconvenient, if not impossible.

It is with the above facts in view that I have designed the present invention which has for an important object the provision of a heat insulating casing adapted to receive and contain an ice cream can or the like and provided with a handle structure of novel and peculiar formation or arrangement whereby it will be necessary for the operator or attendant to carry the device instead of dragging it, the handle means being so arranged with respect to the center of gravity that it would be more awkward to drag the device than to carry it in a normal position.

Another object is to provide a carrier having a removable cover device coacting with the securing means therefor and, to a certain extent, the handle structure whereby the cover will be held more securely and in tighter relation with respect to the enclosing container in proportion to the weight or to the strain brought upon the handle.

Still another object is to provide a carrier and container so constructed and arranged that the means for holding the cover or closure in embracing relation to the major portion will act also to force the same into firm seating engagement so as to prevent any possibility whatsoever of leakage of air.

Still another object of the invention is to provide a carrier or casing of this character in which there is no necessity for the employment of a skeleton frame, the device actually consisting of a cylindrical structure of such material as to be capable of maintaining its shape regardless of whether or not an ice cream can is disposed therein, the material used possessing considerable rigidity in addition to having heat insulating properties.

Still another object is to provide a container or case having a peculiarly constructed cover or closure member which, when drawn down into closed position will act effectually as a seal for positively excluding air and thereby maintaining the temperature of the ice cream or other commodity placed therein at a normal degree.

An additional object is to provide a device of this character which will be simple and inexpensive in manufacture, easy to use, positive in action, efficient and durable in service, and a general improvement in the art.

Figure 2:
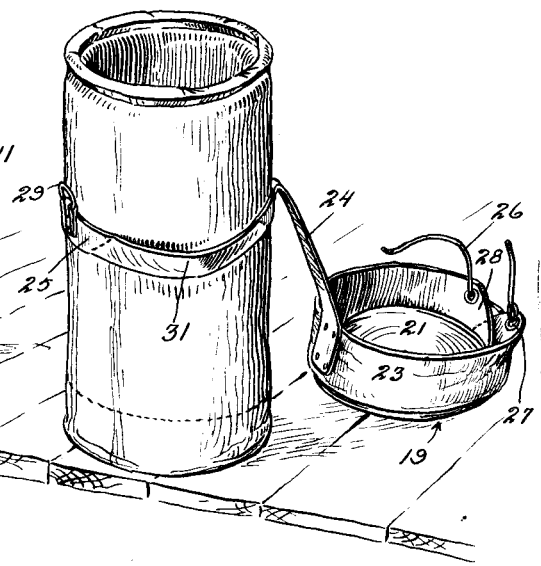
Figure 3:
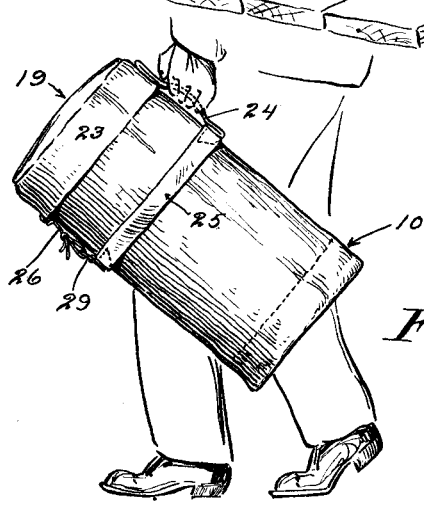

With the above and other objects and advantages in view, the invention consists in the details of construction and arrangement of parts to be hereinafter more fully described and claimed, and illustrated in the accompanying drawings in which:

Figure 1 is a perspective view of the device showing it as being carried by one of the handle members, Figure 2 is a perspective view of one of the devices showing it standing upon a freight or loading platform, Figure 3 is a perspective view of the device showing it carried by the member connecting the cover or closure with the body, Figure 4 is a longitudinal section through the complete device showing an ice cream can therein, the normal tendency of the cover or closure being shown by dot and dash lines.

Figure 5 is a cross section taken on the line 5—5 of Figure 4.

Referring more particularly to the drawings, I have shown the device as comprising a container or case, designated generally by the numeral 10, this case being cylindrical in shape to conform to an ice cream can A of conventional pattern or design. While it is conceivable that the case 10 might have its detailed construction varied in some respects, I have shown it as comprising a bottom member 11 which may be formed of any suitable or desired number of disks 12 of canvas or other similar material, together with a layer 13 of suitable heat insulating material. The case is also shown as comprising a cylindrical portion 14 of wadded felt or other similar material covered with fabric 15 which also extends beneath and about or which is secured to the bottom, it being immaterial whether these portions are integral or simply secured together. While canvas is mentioned at this point and hereinafter, it should of course be understood that the term is intended to be broad enough to include any other fabric such as duck or the like, and to cover such materials as may be waterproof, or not.

The container or case is provided with a lining 16 of suitable flexible material. In other words it may be said that the container or case comprises outer and inner layers or members of fabric or other flexible material between which is located the filling of heat insulating material. It is desirable to omit any skeleton framework such as is ordinarily used in the construction of devices for this purpose, and for this reason no frame is disclosed. Actually, the filling may resemble composition board such as is used in a large number of arts for a wide variety of purposes and it may be of a more or less felt-like nature, the exact structure or composition being immaterial except that the intention is that it possess heat insulating qualities. In the present instance the outside fabric covering 16 is represented as secured to the bottom whereas the inside fabric is disclosed as continuous with the bottom, but it will be readily appreciated that these details do not constitute limitations. The top of the case is preferably beaded as indicated, by the simple expedient of providing a rim member 17 of fabric or other flexible material secured to the inner and outer fabric elements as by stitching indicated at 18, the stitching at this point acting to define what might be called a bead which will have considerable rigidity as compared with the remainder of the structure, though it should be distinctly understood that the construction of the case is preferably such that it will be capable of standing alone regardless of whether or not an ice cream can is contained therein, the particular type or character of material being such as to insure this characteristic or capability. The advantage in this is that the case will maintain its shape at all times without collapsing and that it will therefore be a simple matter to insert the can therein or remove it therefrom. The absence of an interiorly arranged frame is of benefit in that there are no metallic parts to conduct heat and therefore affect the temperature of the ice cream within the can. The employment of a more or less felted material is, naturally, advantageous inasmuch as it will constitute protecting means for the ice cream can and prevent denting thereof even though it is handled roughly. Obviously, the bottom portion and the cylindrical portion may be formed integrally or separately, and in the latter instance it is clear that any suitable means may be provided for effecting securing of the parts, it being immaterial whether this be done by stitching or cementing.

The container is adapted to be closed by a cover designated generally by the numeral 19, this cover being circular in shape and formed of any desired or necessary number of pieces or plies of fabric or other flexible material indicated at 20 and 21, these pieces being secured together near their edge portions by any desired means, such as stitching, and the space between them being filled with padding 22 having heat insulating properties. This cover is shown as having a depending skirt 23 which is adapted to fit snugly about the container for excluding air. The underside of the cover, as well as the upper, is shown as of partially spherical shape so as to fit snugly against the bead at the open end of the container. If the can A were removed, the bottom of the cover would extend downwardly in approximately the position shown by dot and dash lines in Figure 4. However, when the can is in place and the cover drawn by the means to be described the bottom surface of the cover will engage against the can end and be flattened out as indicated in the same figure but it is clear that when this is done the lower fabric sheet of the cover will conformingly engage against the bead at the open end of the case for making a substantial seal which will exclude air.

Secured to some convenient point on the depending skirt 23 is a flexible strip or strap member 24 which has its other end riveted or otherwise fastened to a band 25, likewise of flexible material and suitably secured to the case at substantially the central portion thereof. For holding the cover closed, use may be made of a rope or other flexible member of a similar nature indicated at 26, this rope being threaded through eyelets 27 on the skirt 23, the skirt being shown as having a slit therein or being interrupted so as to provide an overlap 28, the provision of the interruption or opening facilitating the engagement of the cover upon the case and the overlap making it possible to draw the skirt into snug engagement about the case. The flexible member 26 is also threaded through a ring or the like 29 suitable secured to the band 25 at a point preferably diametrically opposite the point of attachment of the member 24. It is conceivable that the device may be carried by the member 24, as indicated in Figure 3.

The principal carrying means is, however, the band 25 which is secured to the case at intervals only as disclosed at 30 in Figure 5, the unsecured portions of the band being preferably spaced slightly away from or bulging outwardly with respect to the case to define loops or handles 31, either of which may be grapsed by the operator or attendant as shown in Figure 1.

In the use, the can is slipped into the case, the cover is placed in position and the flexible member 26 is passed through the eyelets and the ring, drawn tightly and then tied. The compressing engagement of the padded cover with the end of the can and the bead at the open end of the case will make a seal for preventing leakage of air which might result in changing the temperature of the can and its contents. As the case is preferably constructed of waterproof fabric padded with heat insulating material it is evident that temperature changes should not occur, at least for a prolonged period. Furthermore, the soft and yielding nature of the case will provide adequate cushioning means preventing denting of or other damage to the can in case of rough handling. The location of the carrying loops 31 is such that when the operator or attendant lifts the entire structure by one of them, the case will tilt into a substantially horizontal position, as shown in Figure 1, so that it may be held at a considerable distance above the ground or other surface instead of being dragged therealong as is a common practice when the ordinary type of case is used. Even if the device is carried by the member 24, as shown in Figure 3, dragging will be inconvenient as the device will tilt sufficiently to clear the loading platform or other surface over which transportation is effected.

From the foregoing description and a study of the drawings it will be apparent that I have thus provided a simply constructed, inexpensive and easily used device for the purpose specified and one which will be of material advantage in every respect. Actual practice has demonstrated that ice cream transported in a protective case constructed in accordance with the invention may be kept in a normal and salable condition for several days even though the temperature of the atmosphere may be excessively high. It is thought that the construction, operation and advantages will be readily apparent to one skilled in the art without further explanation.

While I have shown and described a preferred embodiment of the invention, it should be understood that I reserve the right to make such changes in the form, construction and arrangement of parts as will not depart from the spirit of the invention or the scope of the subjoined claim.

Having thus described the invention, I claim:

In a shipping case of the character described, a cylindrical body member including a bottom formed as a plurality of layers of fabric and a disk of heat insulating material thereon, an outer wall secured to said bottom, a lining of heat insulating material located within said wall, an inner member including a bottom portion seated upon said disk and further including a wall portion located inwardly of said lining of heat insulating material, a flexible member secured within said outer and inner wall members at the open end of the case to define a bead of curved cross sectional configuration, and a compressible cover movably attached to the body and adapted to be drawn into compressing engagement with said bead to form a closure for the open end of the case.

In testimony whereof I affix my signature.

GEORGE F. LESSENHOP.